(12) United States Patent
Hara

(10) Patent No.: US 7,856,127 B2
(45) Date of Patent: Dec. 21, 2010

(54) RIDGE DIRECTION EXTRACTION DEVICE, RIDGE DIRECTION EXTRACTION METHOD, RIDGE DIRECTION EXTRACTION PROGRAM

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 1138 days.

(21) Appl. No.: 11/501,874

(22) Filed: Aug. 10, 2006

(65) Prior Publication Data

US 2007/0047784 A1 Mar. 1, 2007

(30) Foreign Application Priority Data

Aug. 30, 2005 (JP) ............... 2005-249973

(51) Int. Cl.
  *G06K 9/00* (2006.01)
  *G06K 9/34* (2006.01)
  *G06K 9/46* (2006.01)
  *G06K 9/74* (2006.01)

(52) U.S. Cl. .................. 382/124; 382/173; 382/202; 356/71

(58) Field of Classification Search ............ 382/124, 382/173, 202; 356/71
  See application file for complete search history.

(56) References Cited

U.S. PATENT DOCUMENTS

| | | | |
|---|---|---|---|
| 4,811,414 A | | 3/1989 | Fishbine et al. |
| 5,337,369 A | * | 8/1994 | Shibuya ............... 382/125 |
| 5,608,811 A | * | 3/1997 | Kamei ............... 382/124 |
| 5,717,786 A | * | 2/1998 | Kamei ............... 382/204 |
| 5,937,082 A | * | 8/1999 | Funada ............... 382/125 |
| 5,963,656 A | * | 10/1999 | Bolle et al. ............... 382/124 |
| 5,974,163 A | * | 10/1999 | Kamei ............... 382/125 |
| 6,243,492 B1 | * | 6/2001 | Kamei ............... 382/181 |
| 7,027,626 B2 | | 4/2006 | Funada |
| 2002/0164056 A1 | * | 11/2002 | Funada ............... 382/124 |
| 2003/0076986 A1 | * | 4/2003 | Yoon et al. ............... 382/125 |
| 2004/0125993 A1 | * | 7/2004 | Zhao et al. ............... 382/124 |

FOREIGN PATENT DOCUMENTS

| | | |
|---|---|---|
| EP | 0 855 667 A2 | 7/1998 |
| GB | 2 281 799 A | 3/1995 |
| JP | 52-097298 A | 8/1977 |
| JP | 62-272378 A | 11/1987 |
| JP | 05-181956 A | 7/1993 |
| JP | 06-139338 A | 5/1994 |
| JP | 08-007097 A | 1/1996 |
| JP | 2002-288641 A | 10/2002 |
| JP | 2004-153668 A | 5/2004 |

* cited by examiner

*Primary Examiner*—Kathleen S Yuan
(74) *Attorney, Agent, or Firm*—Sughrue Mion, PLLC

(57) ABSTRACT

A ridge direction extraction device capable of extracting ridge directions accurately even in direction unstable areas is provided. In the ridge direction extraction device, a zone direction extractor calculates ridge directions and direction confidence of each zone, and a high confidence zone area determiner determines a high confidence zone area. A direction expectation calculator selects a propagation candidate zone and a reference zone, and calculates direction expectation of the ridge direction of the propagation candidate zone based on the ridge direction and distance of the reference zone. A propagation zone direction extractor recalculates the direction confidence calculated by the zone direction extractor based on the direction expectation of each propagation candidate zone, and extracts the ridge direction of a propagation candidate zone based on the direction confidence recalculated.

13 Claims, 17 Drawing Sheets

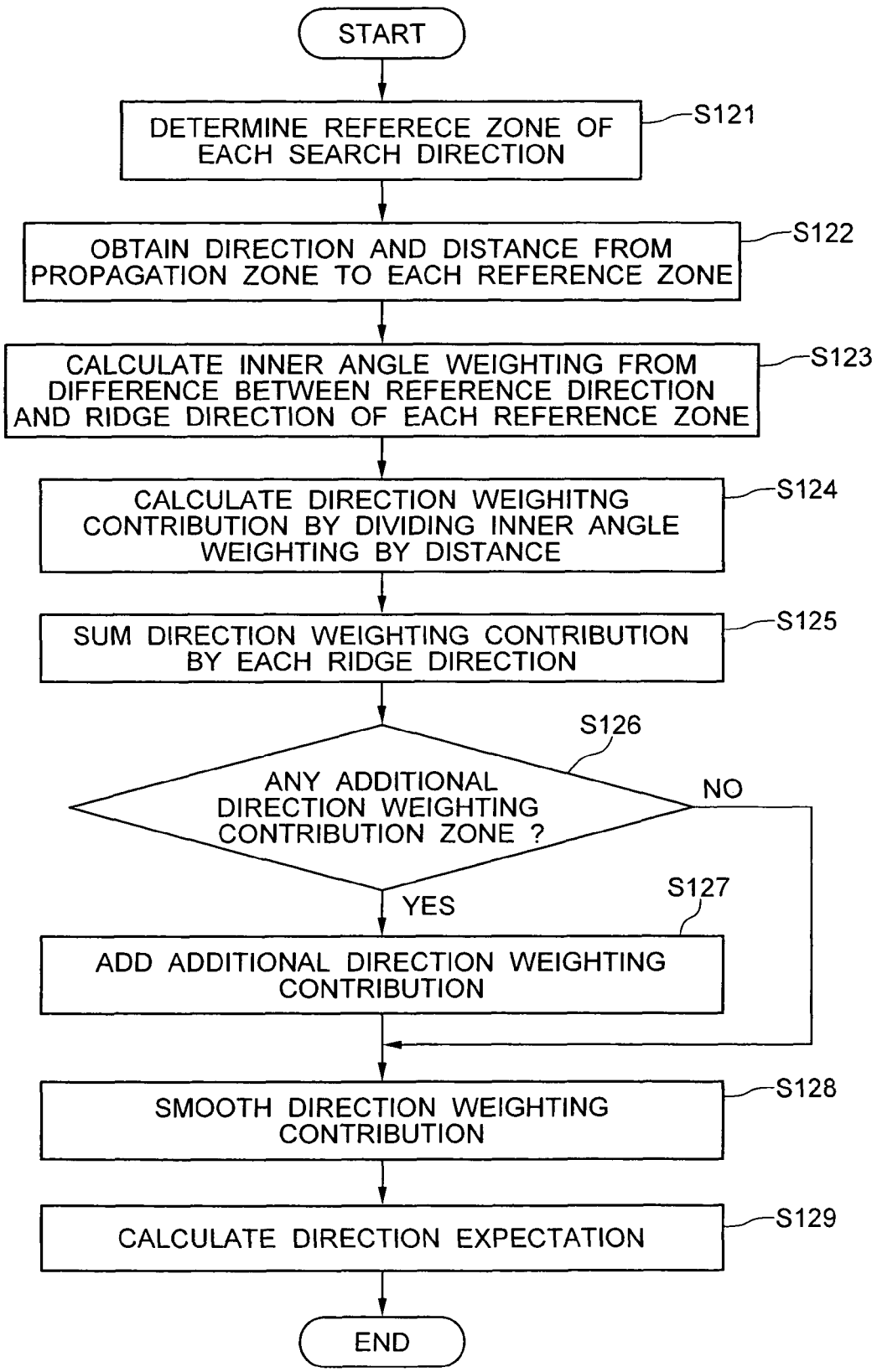

FIG. 9A

| SEARCH DIRECTION | REFERENCE ZONE | DIRECTION | DISTANCE | INNER ANGLE WEIGHTING | DIRECTION WEIGHTING CONTRIBUTION |
|---|---|---|---|---|---|
| 0 | E2 | 7 | 1 | 3 | 3.0 |
| 1 | E1 | 7 | 1 | 5 | 5.0 |
| 2 | D1 | 0 | 1 | 8 | 8.0 |
| 3 | C1 | 1 | 1 | 5 | 5.0 |
| 4 | B2 | 1 | 2 | 3 | 1.5 |
| 5 | A5 | 2 | 3 | 2 | 0.7 |
| 6 | D9 | 4 | 7 | 2 | 0.3 |
| 7 | F4 | 5 | 2 | 3 | 1.5 |

FIG. 9B

| INNER ANGLE | INNER ANGLE WEIGHTING |
|---|---|
| 0 | 2 |
| $\pi/8$ | 3 |
| $\pi/4$ | 4 |
| $3\pi/8$ | 5 |
| $\pi/2$ | 8 |

FIG. 9C

| DIRECTION | DIRECTION WEIGHTING CONTRIBUTION | AFTER SMOOTHING | DIRECTION EXPECTATION |
|---|---|---|---|
| 0 | 8.0 | 7.6 | 144% |
| 1 | 6.5 | 5.4 | 74% |
| 2 | 0.7 | 2.0 | −37% |
| 3 | 0.0 | 0.3 | −92% |
| 4 | 0.3 | 0.5 | −83% |
| 5 | 1.5 | 0.8 | −74% |
| 6 | 0.0 | 2.4 | −24% |
| 7 | 8.0 | 6.0 | 92% |
| AVERAGE | 3.125 | 3.125 | |

FIG. 11A

| REFERENCE DIRECTION | REFERENCE ZONE | DIRECTION | DISTANCE | INNER ANGLE WEIGHTING | DIRECTION WEIGHTING CONTRIBUTION |
|---|---|---|---|---|---|
| 0 | E2 | 7 | 2 | 3 | 1.5 |
| 1 | D1 | 0 | 1 | 4 | 4.0 |
| 2 | C1 | 1 | 1 | 5 | 5.0 |
| 3 | B1 | 1 | 1 | 5 | 5.0 |
| 4 | B2 | 1 | 1 | 3 | 3.0 |
| 5 | B3 | 2 | 1 | 2 | 2.0 |
| 6 | C9 | 3 | 7 | 2 | 0.3 |
| 7 | F5 | 4 | 3 | 4 | 1.3 |

FIG. 11B

| DIRECTION | DIRECTION WEIGHTING CONTRIBUTION | AFTER SMOOTHING | DIRECTION EXPECTATION |
|---|---|---|---|
| 0 | 4.0 | 6.4 | 114% |
| 1 | 16.0 | 9.5 | 219% |
| 2 | 2.0 | 5.1 | 71% |
| 3 | 0.3 | 0.7 | −78% |
| 4 | 0.0 | 0.1 | −97% |
| 5 | 0.0 | 0.0 | −100% |
| 6 | 0.0 | 0.4 | −87% |
| 7 | 1.5 | 1.8 | −41% |
| AVERAGE | 3.0 | 3.0 | |

FIG. 12

| DIRECTION | DIRECTION CONFIDENCE | DIRECTION EXPECTATION | CONFIDENCE AFTER ADJUSTMENT |
|---|---|---|---|
| 0 | 40 | 144% | 97.6 |
| 1 | 30 | 74% | 52.1 |
| 2 | 15 | −37% | 9.5 |
| 3 | 20 | −92% | 1.6 |
| 4 | 50 | −83% | 8.4 |
| 5 | 55 | −74% | 14.5 |
| 6 | 60 | −24% | 45.6 |
| 7 | 50 | 92% | 96.0 |

RIDGE DIRECTION EXTRACTION DEVICE, RIDGE DIRECTION EXTRACTION METHOD, RIDGE DIRECTION EXTRACTION PROGRAM

BACKGROUND OF THE INVENTION

1. Field of the Invention

The present invention relates to a technique for extracting ridge directions in respective zones from a fingerprint image divided into a plurality of zones. In particular, the present invention relates to a ridge direction extraction device and the like, capable of extracting ridge directions accurately even in areas such as near core and delta where ridge directions are unstable.

2. Description of Related Art

Conventionally, various proposals have been made for ridge direction extraction devices.

For example, conventional art shown in Japanese Patent Laid-Open Publication No. 52-97298 or in its U.S. Pat. No. 5,717,786 (Patent Document 1) utilizes a fact that relating to the direction of a streak in a pixel of a streaked pattern image, contrast of gray scale is smaller in a direction same as the streak but is larger in a direction orthogonal to the streak, whereby extreme values in the amount of gray scale contrast with reference to predetermined multiple quantizing directions are calculated to thereby determine the direction of streak from the extreme values.

In Japanese Patent Laid-Open Publication No. 8-7097 (Patent Document 2), a gradient vector is calculated in a pixel in which ridge direction is to be defined to thereby determine the ridge direction of each pixel.

Further, in Japanese Patent Laid-Open Publication No. 2002-288641 or in its U.S. Pat. No. 7,027,626 (Patent Document 3), two-dimensional Fourier transformation is performed in a local area in which ridge directions are to be defined, and by analyzing the peak of the resultant Fourier-transformed plane, ridge directions in the local area are determined.

For reducing the calculation amount, ridge directions are often extracted by a small area (zone) unit of about 8*8 pixels without being calculated for all pixels.

In the conventional art described above, ridge directions are extracted locally. In this case, "locally" means that ridge directions are determined by only using gray scales of pixel groups near the watched pixel, so consistency with the ridge directions of the whole fingerprints is not considered. In such a method of extracting ridge directions, ridge directions are extracted locally by using gray-scale contrasts only in nearby pixel groups, so erroneous ridge directions have been extracted easily due to wrinkles or scars. Further, in areas near core and delta where ridge curvature is high, there has often been a case where accurate ridge directions cannot be extracted.

In order to correct ridge directions extracted erroneously, some methods of smoothing ridge direction patterns have been proposed. Japanese Patent Laid-Open Publication No. 5-181956 or in its U.S. Pat. No. 5,608,811 (Patent Document 4) discloses an example.

However, smoothing processing of ridge directions depends on ridge directions extracted locally in ridge direction extraction processing and the direction confidence data thereof, so even in the ridge directions to which smoothing has been performed, the accuracy thereof has limitations. For example, if erroneous ridge directions are extracted in a wide area affected by noises such as wrinkles, it is impossible to correct them by smoothing processing. Further, in areas near core and delta where ridge direction changes significantly due to high ridge curvature, it has been known that smoothing processing has no effect. In this specification, an area in which direction is stable in a relatively wide area is defined as a direction stable area, and an area in which direction changes significantly such as an area near core or delta is defined as a direction unstable area.

In order to solve this problem, Patent Document 3 discloses a method of extracting ridge directions in which consistency with the all ridge directions is improved by evaluating continuity of ridges.

However, the method described in Patent Document 3 involves a problem that it is not effective in direction unstable areas, although effective in direction stable areas.

In order to explain this example, FIG. 16B shows a case in which ridge directions are extracted by using the conventional art disclosed in Patent Document 3 with respect to the fingerprint image of FIG. 16A, which is shown by being superposed on a gray-scale image. In a direction unstable area above the core in FIG. 16A, an erroneous direction is extracted as shown by the reference numeral 51.

Figures 17A, 17B:
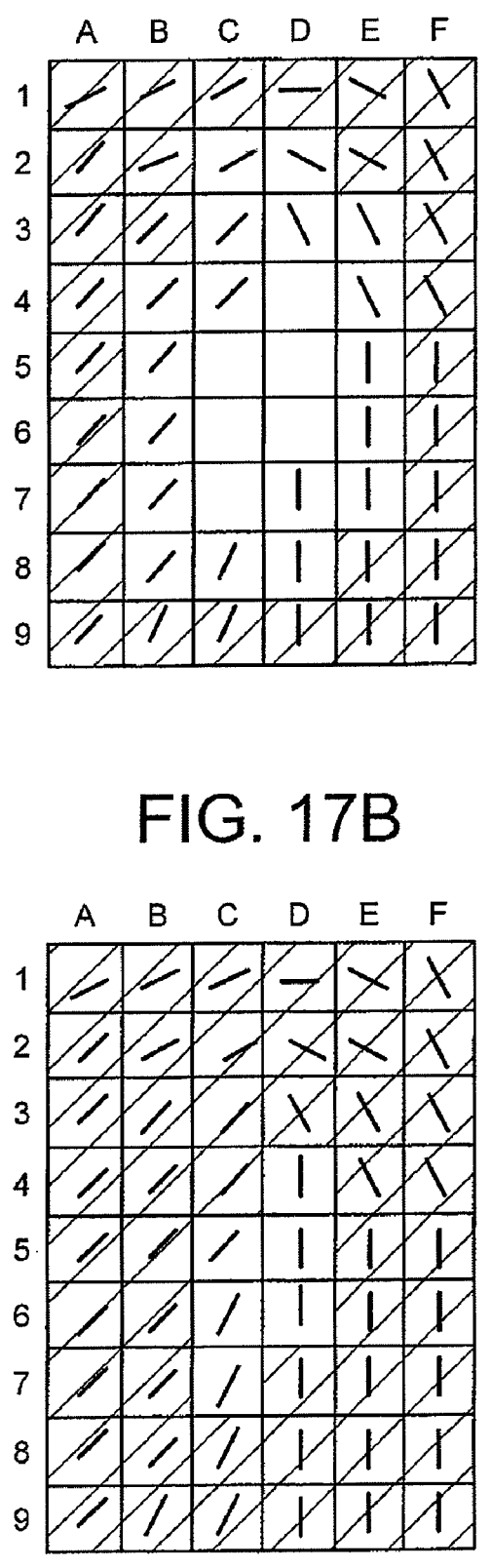

FIGS. 17A and 17B show processes to determine directions relating to the area shown by the reference numeral 51. In FIGS. 17A and 17B, hatched zones (e.g., F6 and F7) are high-confidence zones, and zones in which directions are shown in white backgrounds (not hatched)(e.g., E6 and E7 in FIG. 17A) are zones in which directions are determined in continuity evaluation.

In this conventional art, direction of a zone is determined by using continuity only with directions of neighboring zones. Therefore, in E6 and E7 in FIG. 17A for example, erroneous directions are determined since F6 and F7 are largely affected. Further, in the next step, since directions determined erroneously such as E6 and E7 are referred to, erroneously extracted zones will increase. As an example thereof, zones in which directions are extracted erroneously such as zones D5, D6 and D7 shown in FIG. 17B are caused.

SUMMARY OF THE INVENTION

It is therefore an object of the present invention to provide a ridge direction extraction device and the like, capable of extracting ridge directions accurately even in areas where ridge directions are unstable.

In a ridge direction extraction device of the present invention, a zone direction extractor calculates a ridge direction and direction confidence of each zone formed by dividing a fingerprint image, and a high confidence zone area determiner determines a high confidence zone area consisting of zones with high direction confidence. A direction expectation calculator selects a reference zone having the shortest distance from the propagation candidate zone in each of the search directions, and calculates direction expectation of the ridge direction based on the ridge direction of the reference zone and the distance. Direction expectation means a digitized contribution given by the ridge direction of each reference zone to the direction confidence of the propagation zone.

A propagation zone direction extractor recalculates the direction confidence calculated by the zone direction extractor based on the direction expectation of each propagation zone, and based on the direction confidence recalculated, ridge direction of the propagation candidate zone is extracted.

According to the ridge direction extraction device, when the propagation zone direction extractor determines the ridge direction of a propagation candidate zone, the direction confidence outputted from the zone direction extractor is recalculated based on direction expectation calculated based on ridge directions of the reference zone area by the direction expectation calculator, and by using the direction confidence recalculated, the ridge direction of the propagation zone is determined.

Therefore, even in an area where a ridge direction is unstable, it is possible to extract a further accurate ridge direction having high continuity with the ridge directions of the adjacent high confidence area and less deviation from the actual ridge direction.

Further, when the direction expectation calculator calculates direction expectation of a propagation candidate zone, it uses not only ridge directions of zones adjacent to the propagation candidate zone but also ridge direction of multiple reference zones searched in multiple directions.

Therefore, it is possible to extract a ridge direction having continuity not only with ridge directions of adjacent high confidence area but also with ridge directions of non-adjacent zones in high confidence area.

In the ridge direction extraction device, the search directions may include eight directions in which an angle between adjacent directions is $\pi/4$ radian.

With this configuration, zones typically expressed in rows and columns can be searched easily.

In the ridge direction extraction device, the direction expectation calculator may be so configured as to calculate inner angle weighting and direction weighting contributions, to calculate a weighting contribution for each ridge direction by summing the direction weighting contributions for each ridge direction of the reference zone and an average weighting contribution for each direction which is an average value of the weighting contributions for each ridge direction, and to calculate the direction expectation based on the ratio between the weighting contribution for each ridge direction and the average weighting contribution for each direction.

With this configuration, large weighting can be applied to a ridge direction of a reference zone in which an angle crossing the search direction is large. Therefore, it is possible to extract an accurate ridge direction even for an area near the core or delta in which a looped ridge is present.

In the ridge direction extraction device, the direction expectation calculator may be so configured as to smooth the weighting contribution for each ridge direction, and to calculate the direction expectation based on the ratio between the smoothed weighting contribution for each ridge direction and the average weighting contribution for each direction.

With this configuration, it is possible to suppress a deviation of direction confidence after recalculation from the direction confidence before recalculation to be small.

In the ridge direction extraction device, if the reference zones includes two zones adjacent to the propagation candidate zone, in which search directions are different by $\pi$ radian and a difference in ridge directions is not more than $\pi/4$ radian, the direction expectation calculator may add an average of direction weighting contributions for the ridge directions of the two zones to a weighting contribution for each ridge direction of the intermediate ridge direction between the ridge directions of the two zones.

With this configuration, it is possible to extract an accurate ridge direction for a zone near the core or delta having high curvature.

A ridge direction extraction method of the present invention comprises the steps of: calculating the ridge direction of each zone and direction confidence of the ridge direction and storing them on a memory; determining a high confidence zone area which is a collection of high confidence zones in each of which the direction confidence is not less than a prescribed threshold; selecting a reference zone, for each of a plurality of search directions, which is a zone having the shortest distance from a propagation candidate zone in the search directions, from the high confidence zones; calculating direction expectation based on the ridge direction of the reference zone and the distance; recalculating the direction confidence based on information of the direction confidence read out from the memory and the direction expectation; and extracting the ridge direction of the propagation candidate zone based on the direction confidence recalculated.

According to the ridge direction extraction method, when ridge direction of a propagation candidate zone is determined, the direction confidence stored on the memory is recalculated based on direction expectation calculated based on ridge directions of the reference zone area, and by using the direction confidence recalculated, the ridge direction of the propagation zone is determined.

Therefore, even in an area where a ridge direction is unstable, it is possible to extract a more accurate ridge direction having high continuity with the ridge directions of the adjacent high confidence area and less deviation from the actual ridge direction.

Further, when direction expectation is calculated, not only ridge directions of zones adjacent to the propagation candidate zone but also ridge directions of multiple reference zones searched in multiple directions are used.

Therefore, it is possible to extract a ridge direction having good continuity not only with ridge directions of high confidence area adjacent to the propagation candidate zone but also with ridge directions of non-adjacent zones in high confidence area.

A ridge direction extraction method of the present invention comprises the steps of: calculating the ridge direction of each zone and direction confidence of the ridge direction and storing them on a memory; determining a high confidence zone area which is a collection of high confidence zones in each of which the direction confidence is not less than a prescribed threshold; selecting a reference zone, for each of a plurality of search directions, which is a zone having the shortest distance from a propagation candidate zone in the search directions, from the high confidence zones; and calculating direction expectation based on the ridge direction of the reference zone and the distance. The method further comprising the steps of: determining whether distribution of the direction expectation is large, and if the distribution is not large, recalculating the direction confidence based on information of the direction confidence read out from the memory and the direction expectation, and if the distribution is large, calculating the direction confidence from the fingerprint image by using a reference size smaller than that used for calculating the direction confidence initially, and then, based on the direction confidence newly calculated and the direction expectation, recalculating the direction confidence. Then, the ridge direction of the propagation candidate zone is extracted based on the direction confidence recalculated.

According to the ridge direction extraction method, it is possible to extract a ridge direction having good continuity not only with ridge directions of high confidence area adjacent to the propagation confidence zone but also with ridge directions of non-adjacent zones in high confidence area. Further, it is also possible to extract an accurate direction for a zone near the core or delta having high curvature.

A ridge direction extraction program of the present invention causes a computer to execute the functions of: extracting a zone direction in which a ridge direction of each zone and direction confidence of the ridge direction are calculated and stored on a memory; determining a high confidence zone area which is a collection of high confidence zones in each of which the direction confidence is not less than a prescribed threshold; selecting a reference zone, for each of a plurality of search directions, which is a zone having the shortest distance in the search direction from a propagation candidate zone, from the high confidence zones; calculating direction expectation based on the ridge direction of the reference zone and the distance; recalculating the direction confidence based on information of the direction confidence read out from the memory and the direction expectation; and extracting the ridge direction of the propagation candidate zone based on the direction confidence recalculated in the step of recalculating.

According to the ridge direction extraction program, the direction confidence stored on the memory is recalculated based on direction expectation calculated based on ridge directions of the reference zone area, and by using the direction confidence recalculated, the ridge direction of the propagation zone can be determined.

Therefore, by causing the computer to operate as a ridge direction extraction device, even in an area where a ridge direction is unstable, it is possible to extract a more accurate ridge direction having high continuity with the ridge directions of the adjacent high confidence area and less deviation from the actual ridge direction.

Further, direction expectation can be calculated by using not only ridge directions of zones adjacent to the propagation candidate zone but also ridge directions of multiple reference zones searched in multiple directions.

Therefore, it is possible to extract a ridge direction having good continuity not only with ridge directions of the adjacent high confidence area but also with ridge directions of non-adjacent zones in high confidence area.

A ridge direction extraction program of the present invention causes a computer to execute the functions of: extracting a zone direction in which a ridge direction of each zone and direction confidence of the ridge direction are calculated and stored on a memory; determining a high confidence zone area which is a collection of high confidence zones in each of which the direction confidence is not less than a prescribed threshold; selecting a reference zone, for each of a plurality of search directions, which is a zone having the shortest distance in the search direction from a propagation candidate zone, from the high confidence zones; calculating direction expectation based on the ridge direction of the reference zone and the distance; and determining whether distribution of the direction expectation is large. If the distribution is not large, the program causes the computer to execute a first direction confidence recalculation function to read out the direction confidence from the memory and to recalculate the direction confidence based on this information and the direction expectation, and if the distribution is large, causes the computer to execute a second direction confidence recalculation function to calculate the direction confidence of the propagation candidate zone from the fingerprint image by using a reference size smaller than that used in executing the function of extracting the zone direction, and based on the direction confidence newly calculated and the direction expectation, recalculate the direction confidence. Further, the program causes the computer to execute a function of extracting the ridge direction of the propagation candidate zone based on the direction confidence recalculated in the first direction confidence recalculation function or the second direction confidence recalculation function.

According to the ridge direction extraction program described above, it is possible to extract a ridge direction having good continuity not only with ridge directions of high confidence area adjacent to the propagation confidence zone but also with ridge directions of non-adjacent zones in high confidence area. Further, it is also possible to extract an accurate direction for a zone near the core or delta having high curvature.

EFFECT OF THE INVENTION

According to the present invention, the direction expectation calculator recalculates the direction confidence based on direction expectation calculated based on ridge directions of the reference zone area, and by using the direction confidence recalculated, determines the ridge direction of the propagation zone.

Therefore, even in an area where a ridge direction is unstable, it is possible to extract a more accurate ridge direction having high continuity with the ridge directions of the adjacent high confidence area and less deviation from the actual ridge direction.

Further, direction expectation can be calculated by using not only ridge directions of zones adjacent to the propagation candidate zone but also ridge directions of multiple reference zones searched in multiple directions.

Therefore, it is possible to extract a ridge direction having good continuity not only with ridge directions of the adjacent high confidence area but also with ridge directions of non-adjacent zones in high confidence area.

BRIEF DESCRIPTION OF THE DRAWINGS

FIG. 4 is a flowchart showing operation of a direction expectation calculator;

FIG. 9A is a table for explaining a method of calculating direction weighting contribution, FIG. 9B is a table showing an exemplary definition of inner angle weighting, and FIG. 9C is a table for explaining a method of calculating direction expectation;

FIG. 11A is a table for explaining a method of calculating direction weighting contribution, and FIG. 11B is a table for explaining a method of calculating direction expectation;

FIG. 12 is a table for explaining a method of adjusting direction confidence;

FIGS. 17A and 17B are maps showing directional patterns near the core extracted by means of conventional art.

DESCRIPTION OF PREFERRED EMBODIMENT

Hereinafter, configuration and operation of a minutia extraction device (ridge direction extraction device) 10 which is an embodiment of the present invention will be explained with reference to the drawings.

(Configuration of Minutia Extraction Device 10)

Figure 1:
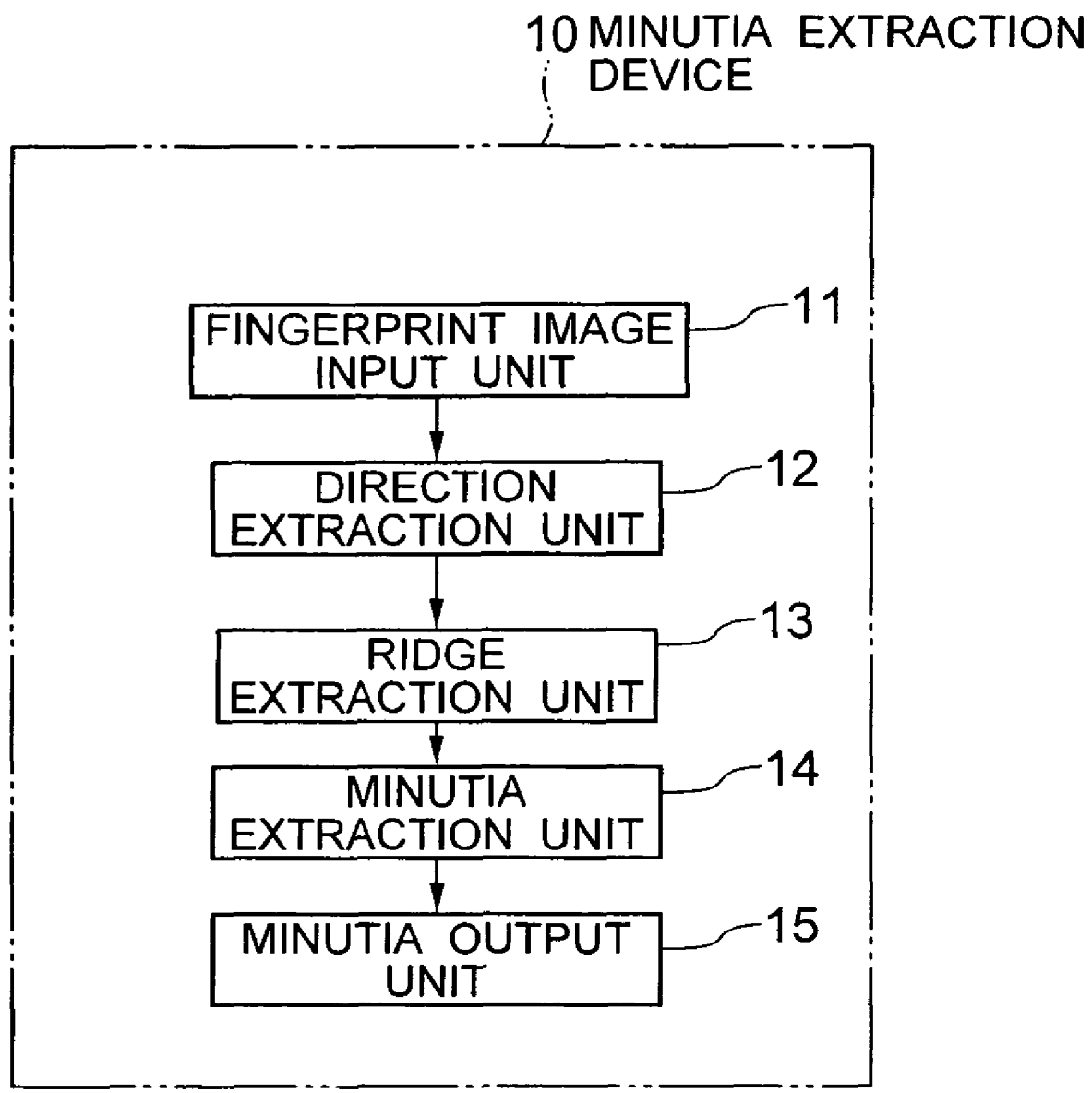
FIG. 1 is a function block diagram of a minutia extraction device which is an embodiment of the present invention.

FIG. 1 is a function block diagram showing the configuration of the minutia extraction device 10.

The minutia extraction device 10 is a personal computer for example, including a fingerprint image input unit 11, a direction extraction unit 12, a ridge extraction unit 13, a minutia extraction unit 14 and a minutia output unit 15.

The fingerprint image input unit 11 digitizes and inputs a fingerprint image captured by a sensor or a scanner for example. The fingerprint image input unit 11 may input a fingerprint image, which has been digitized, as a file.

The direction extraction unit 12 has a function of extracting ridge direction from a fingerprint image inputted by the fingerprint image input unit 11.

The ridge extraction unit 13 has a function of extracting fingerprint ridges from a fingerprint image by using direction data extracted by the direction extraction unit 12.

The minutia extraction unit 14 has a function of extracting minutiae from ridges extracted by the ridge extraction unit 13.

The minutia output unit 15 has a function of outputting minutia data extracted by the minutia extraction unit 14.

Figure 2:
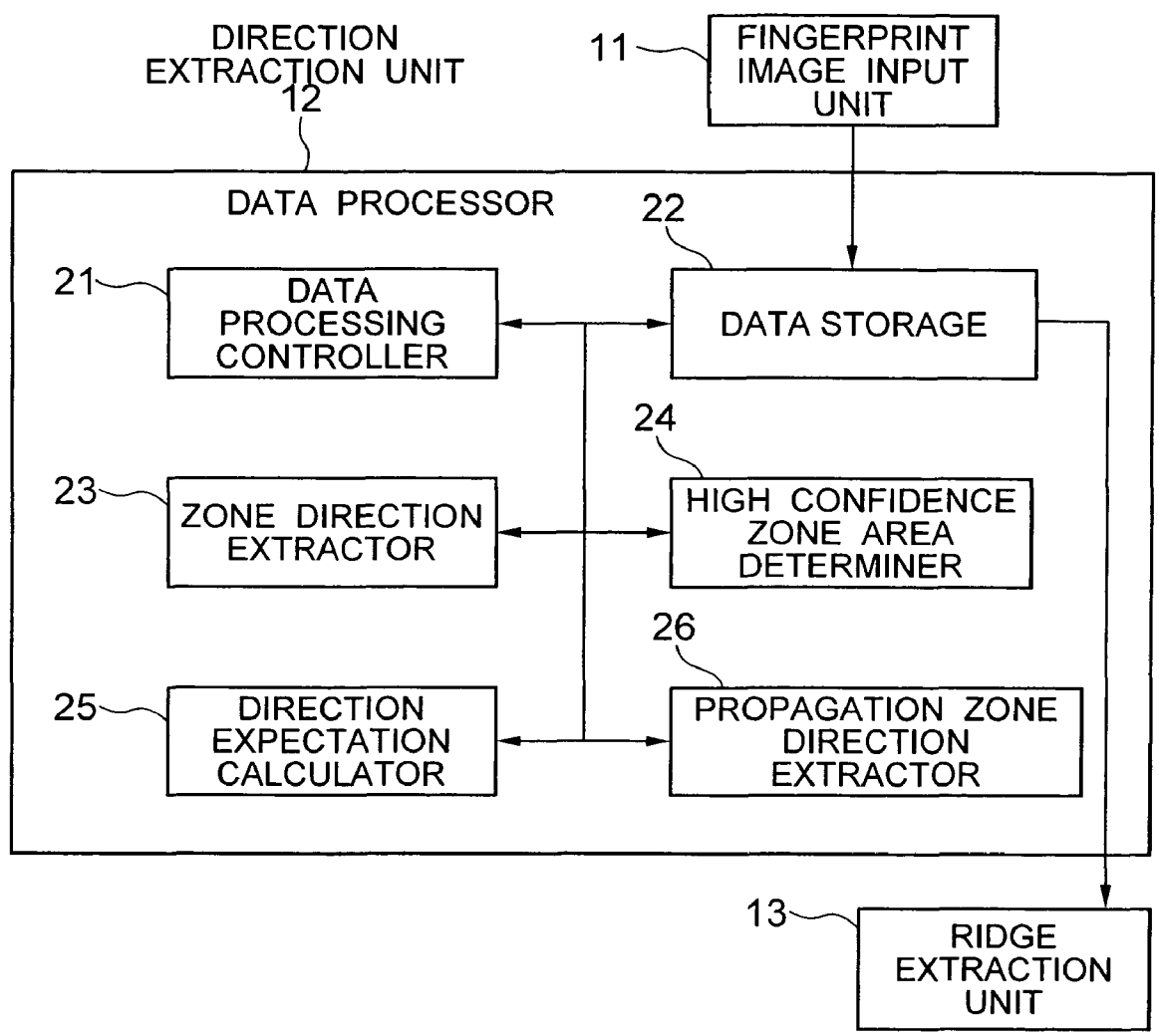
FIG. 2 is a block diagram of a direction extraction unit.

FIG. 2 is a function block diagram showing the configuration of the ridge direction extraction unit 12.

The ridge direction extraction unit 12 includes a data processing controller 21, a data storage (memory) 22, a zone direction extractor 23, a high confidence zone area determiner 24, a direction expectation calculator 25, and propagation zone direction extractor 26.

The data processing controller 21 controls transfer of data and massages performed between the respective units mentioned above constituting the direction extraction unit 12.

The data storage 22 consists of a RAM (Random Access Memory) for example, which is used as an operating area by the respective units mentioned above constituting the ridge direction extraction unit 12. Further, it is also used to temporarily store information calculated by the respective units. Moreover, it is also used to store data transferred between the fingerprint image input unit 11 and the ridge extraction unit 13 and the direction extraction unit 12.

The zone direction extractor 23 captures a fingerprint image via the fingerprint image input unit 11, divides the fingerprint image into a plurality of zones, and calculates ridge direction and its direction confidence for each zone. This calculation can be carried out by using conventional art. For example, as disclosed in JP2002-288641A, it is possible to determine a ridge direction in a local area by performing two-dimensional Fourier transformation to the image in a zone in which ridge direction is to be determined, and analyzing peaks in the resultant Fourier-transformed plane. In this case, the direction confidence can be defined based on the power around the peaks.

The high confidence zone area determiner 24 determines a high confidence zone area based on the direction confidence of the ridge direction of each zone calculated by the zone direction extractor 23. A high confidence zone area is an area in which zones having higher direction confidence than a predetermined threshold are adjacent continuously. The high confidence zone area determiner 24 determines the largest high confidence zone area among high confidence zone areas. This determination is performed such that if there is only one high confidence zone area, it is determined as the largest high confidence zone area, and if there are two or more high confidence zone areas, one having the largest area is determined as the largest high confidence zone area. Alternatively, a high confidence zone area nearest to the core may be the largest high confidence zone area.

The high confidence zone area determiner 24 extracts zones adjacent to the largest high confidence zone area from zones in which direction confidence is not more than a threshold, and marks these zones as propagation candidate zones.

The direction expectation calculator 25 searches respective search directions around each propagation zone to thereby determine reference zones. The direction expectation calculator 25 calculates inner angle weighting and direction weighting contributions of the reference zones, sums the direction weighting contributions by each direction of the reference zones to thereby calculate weighting contribution for each ridge direction, and calculates direction expectation based on the ratio between the weighting contribution for each ridge direction and the average thereof.

The propagation zone direction extractor 26 recalculates the direction confidence of the propagation candidate zones based on direction expectation of each propagation candidate zone calculated by the direction expectation calculator 25, and extracts direction of each propagation candidate zone based on the recalculated direction confidence.

(Operation of Direction Extraction Unit 12)

Figure 3:
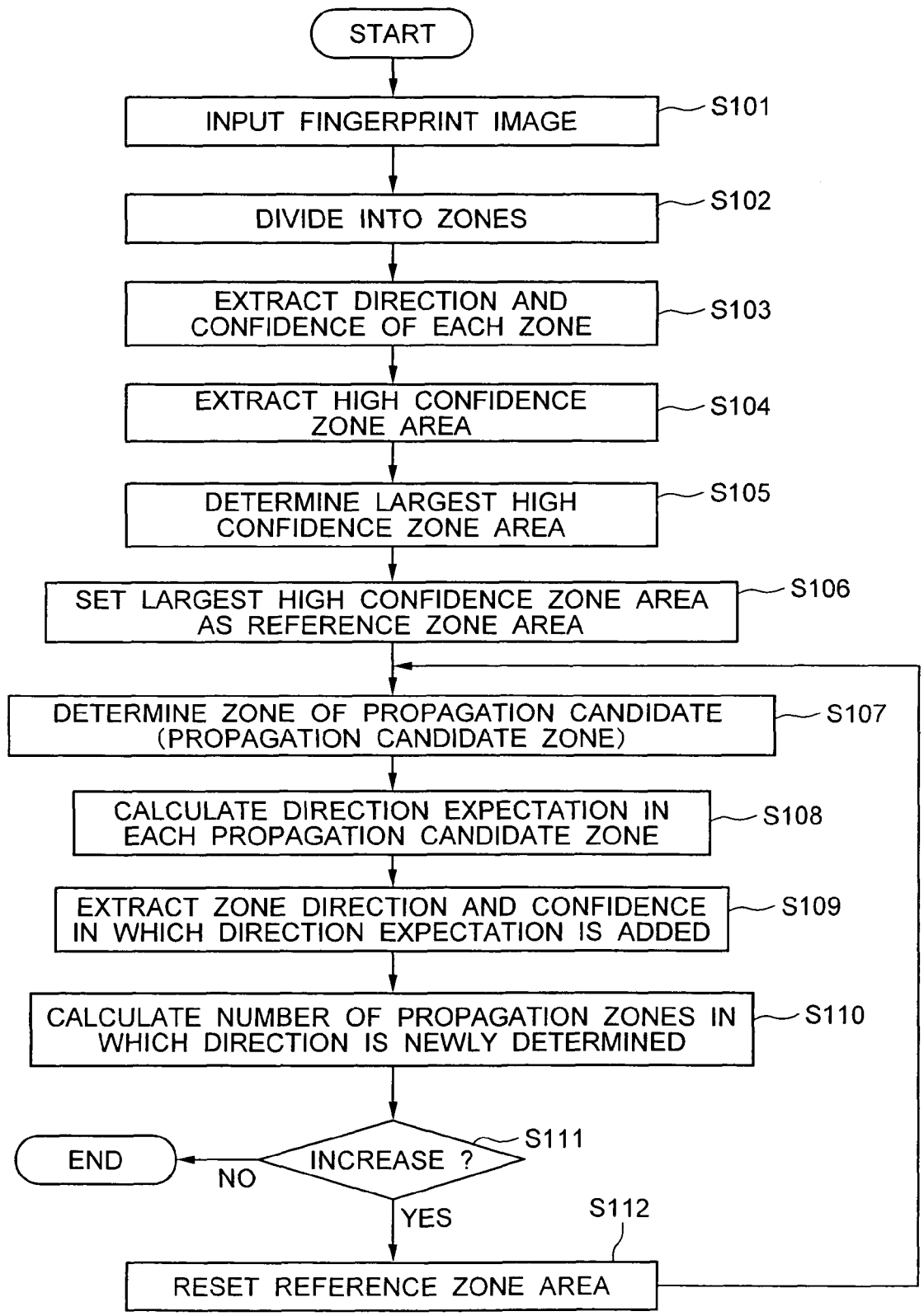
FIG. 3 is a flowchart showing operation of the direction extraction unit as a whole and a fingerprint image input unit.

FIG. 3 is a flowchart showing operation of the direction extraction unit 12 as a whole and the fingerprint image input unit 11.

In step S101 in FIG. 3, the fingerprint image input unit 11 in FIG. 2 inputs a fingerprint image. This is performed such that an image captured by a scanner is digitized and inputted. Alternatively, a case of inputting a fingerprint image file, which has been digitized, is also acceptable, for example.

Next, in step S102 in FIG. 3, the zone direction extractor 23 in FIG. 2 divides the inputted fingerprint image into zones. Although accuracy in extracting direction is improved by making the size of a zone smaller, the processing time becomes longer. Therefore, the size of a zone is set appropriately while considering the required accuracy and processing capacity of the computer.

Next, in step S103 in FIG. 3, the zone direction extractor 23 extracts ridge direction (hereinafter simply referred to as "direction") and the direction confidence for each zone. This extraction can be performed by using conventional art.

Figure 5A:
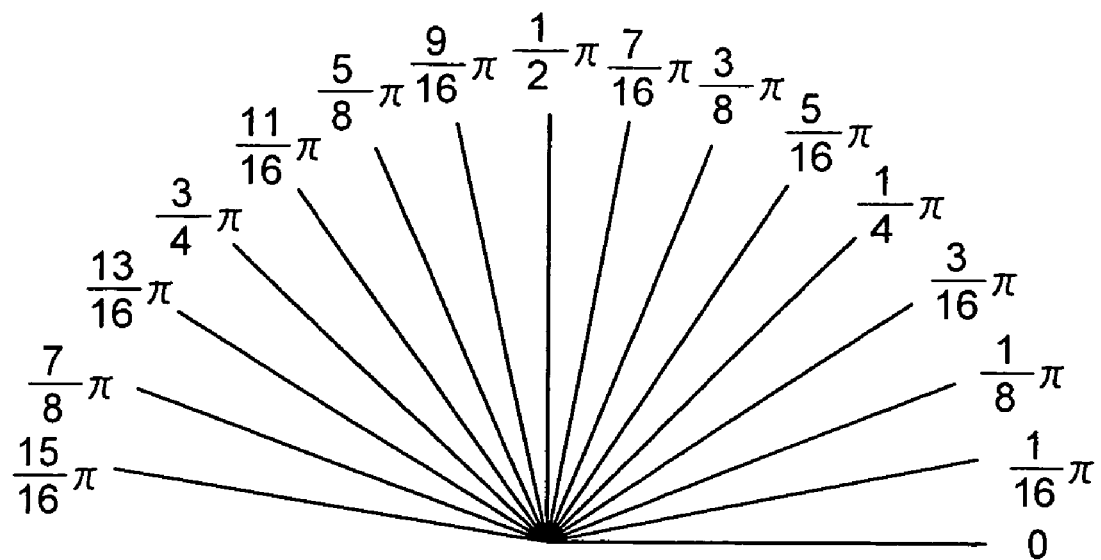
FIG. 5A shows exemplary direction patterns divided into 16 directions.
Figure 5B:
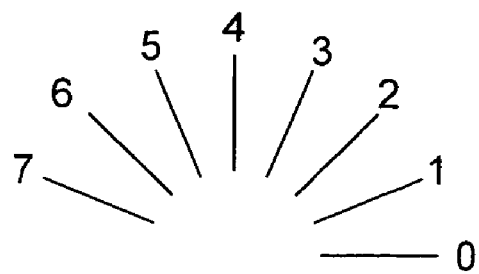
FIG. 5B shows exemplary direction patterns divided into 8 directions.
Figure 8A:
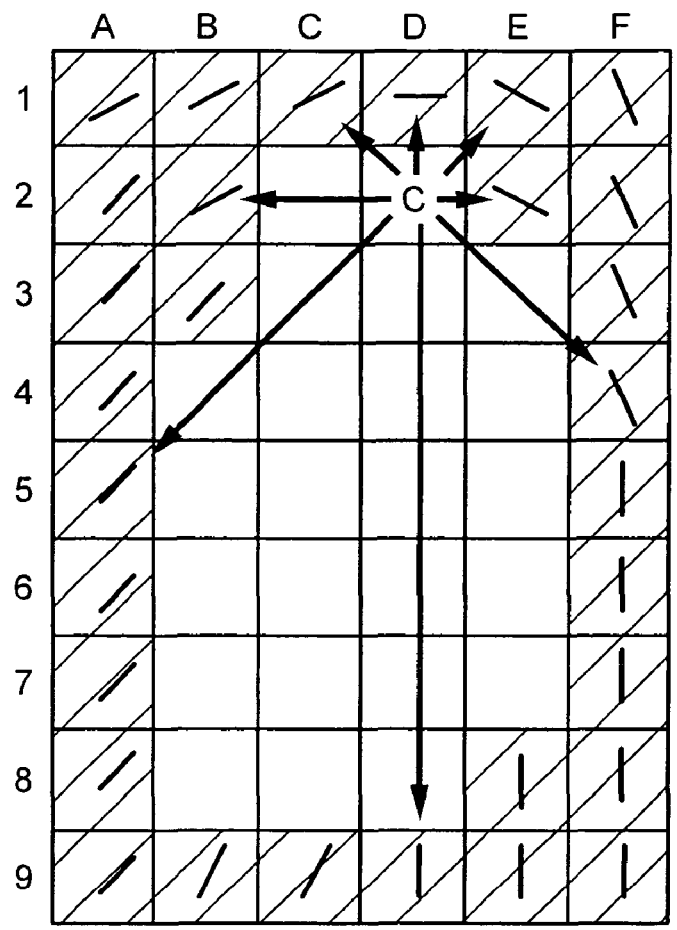
FIG. 8A is a map showing a method of searching for reference zones.

Directions are often coded by being quantized in 16 directions shown in FIG. 5A and 8 directions shown in FIG. 5B.

In the example of FIG. 5A, ridge directions will be shown in 16 directions which are increase by $\pi/16$ radian sequentially in a counterclockwise direction from the horizontal direction. In the example of FIG. 5B, "direction 0" indicates the horizontal direction, and directions are increased by $\pi/8$ radian sequentially from "direction 1" in a counterclockwise direction.

As the divided number of directions increases, accuracy is improved but the processing time becomes longer. Therefore, the divided number of directions should be set appropriately while considering the required processing accuracy and the processing capacity of the computer.

In the description below, directions will be expressed by the method shown in FIG. 5B.

Figure 6:
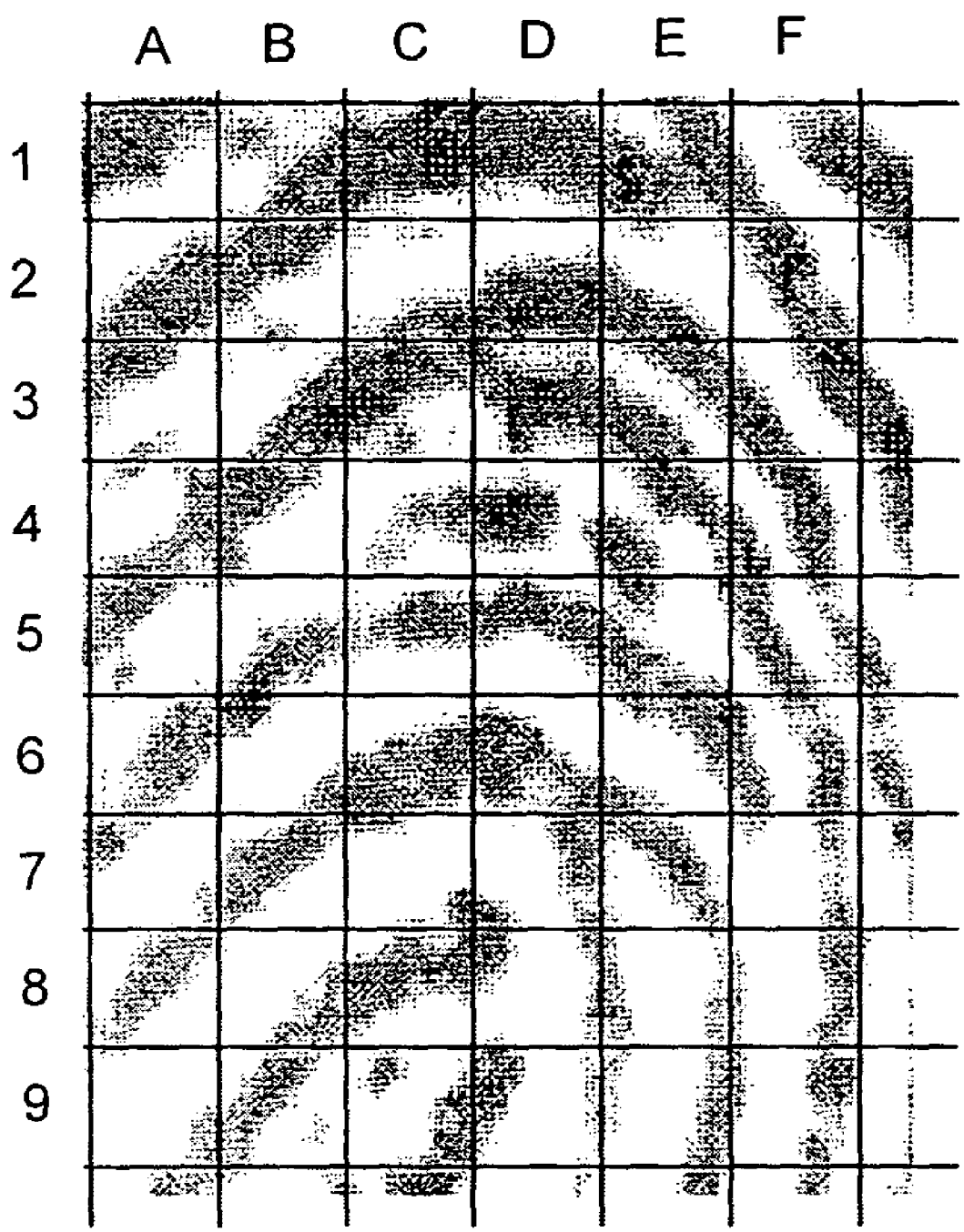
FIG. 6 shows an exemplary fingerprint image divided into zones.
Figure 16A:
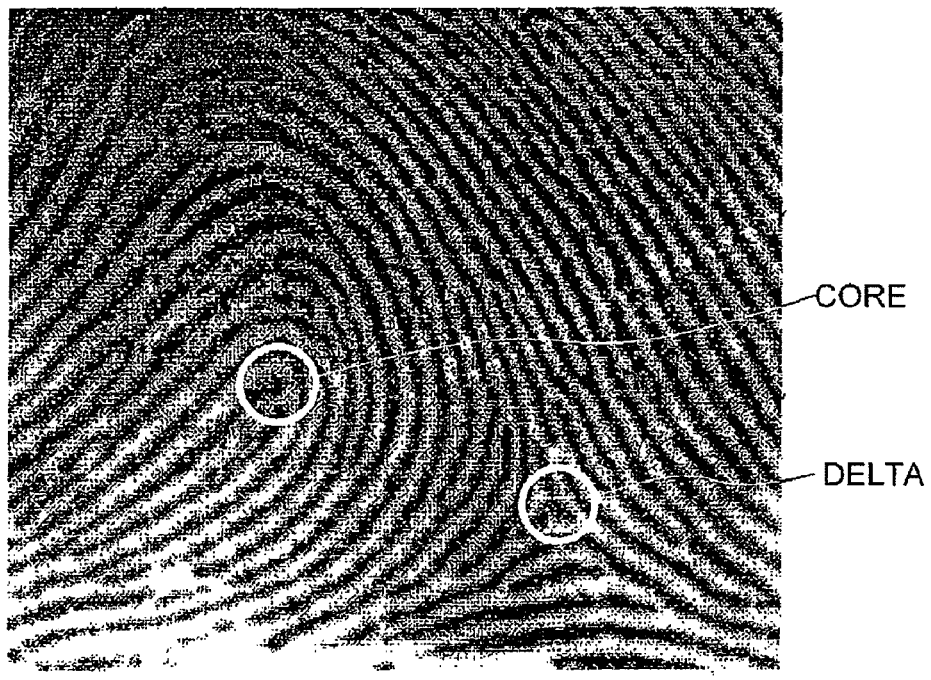
FIG. 16A shows an exemplary fingerprint image.

The image shown in FIG. 6 is a cut-out area above the core shown in FIG. 16A, and is used for explaining the operation of the direction extraction unit 12. Further, the direction patterns shown in the respective zones in FIG. 7 and the like correspond to the image in FIG. 6.

In FIG. 6, the image is divided into zones of 9 rows and 6 columns. The respective zones are indicated by expressing the columns in A to F and the rows in 1 to 9.

Direction patterns in FIGS. 7 to 17 are those indicated in 8 directions as shown in FIG. 5B with respect to the image shown in FIG. 6.

In step S103, direction confidence is calculated for the respective directions 0 to 7 shown in FIG. 5B for each zone. Then, if there is a direction that the direction confidence is higher than a prescribed threshold in a zone, a direction of the highest direction confidence is set as the direction of the zone. If there is no direction that the direction confidence is higher than a prescribed threshold, the direction of the zone is not determined but suspended. In either case, the calculation results of direction confidence will be stored on the data storage 22 by the data controller 21 for all directions of all zones.

Next, in step S104 in FIG. 3, the high confidence zone area determiner 24 in FIG. 2 first extracts all zones in which the direction confidence is higher than a prescribed threshold, and then determines an area in which the extracted zones are adjacent continuously. Such a continuously adjacent zone area is called a high confidence zone area. Two or more high confidence zone areas may be present separately.

Next, in step S105 in FIG. 3, the high confidence zone area determiner 24 determines the largest high confidence zone area under the following rules:

1) If there is only one high confidence zone area, it is set as the largest high confidence zone area.

2) If there are two or more high confidence zone areas, one having the largest area is set as the highest confidence zone area. Alternatively, a high confidence zone area nearest to the core may be set as the largest high confidence zone area.

The reason for setting the largest high confidence zone area in step S105 will be described. For example, in the case where fingerprints are duplicated erroneously, two high confidence continuing areas may be extracted. In these two areas, directional continuity is not guaranteed. Accordingly, if the direction of propagation zones is determined by using the two high confidence continuing areas as reference zones, the direction continuity will be disturbed. The reason for setting the largest high confidence zone area and propagating from one area is to prevent such a disturbance in direction.

If it is found that there are no such duplicated fingerprints, in step S105, processing of steps S106 to S112, described below, may be performed for a plurality of high confidence zone areas respectively, without setting one largest high confidence zone area. With this configuration, it is possible to extract direction for a wide area even when high confidence zone areas are separated.

Next, in step S106 in FIG. 3, the high confidence zone area determiner 24 in FIG. 2 sets the largest high confidence zone area as a reference zone area. A reference zone area is a collection of zones in which directions are determined, and is referred to when directions of propagation candidate zones are reevaluated.

Figure 7:
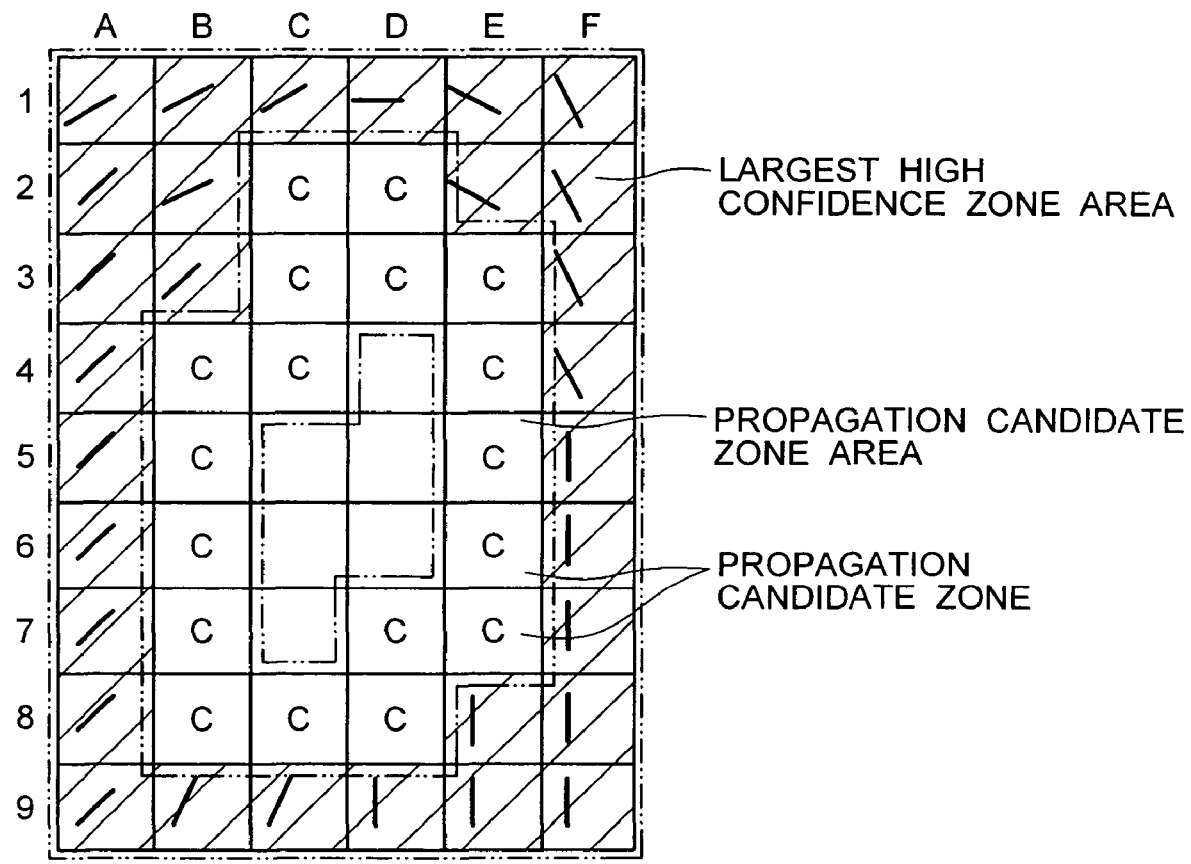
FIG. 7 is a map for explaining a reference zone area and a propagation candidate zone area.

FIG. 7 is a map showing an analyzed state of the fingerprint image. Zones of high direction confidence are hatched, and fixed directions are shown by lines corresponding to FIG. 5B. For example, direction of the zone A1 is "direction 1" of FIG. 5B. Direction patterns of the zones with high direction confidence show the direction of the fingerprint image of FIG. 6 extracted correctly. The largest high confidence zone area in which zones with high direction confidence are adjacent continuously forms a reference zone area.

Next, in step S107 in FIG. 3, the high confidence zone area determiner 24 in FIG. 2 sorts out zones adjacent to the reference zone area, and sets them as candidate zones for propagation. Such zones are called as propagation candidate zones, or simply, propagation zones. In FIG. 7, propagation candidate zones (zone E5, etc.) adjacent to the reference zone area are marked as "C".

Next, in step S108 in FIG. 3, with respect to each propagation candidate zone, the direction expectation calculator 25 in FIG. 2 calculates expectation of each direction that the propagation candidate zone may take. This is called direction expectation. The direction expectation is determined by performing searching each of radial directions from the zone, and a zone direction encountered first in the reference zone area is used to calculate the direction expectation. FIG. 4 is a flowchart showing details of processing in step S108. In FIG. 4, a method of calculating direction expectation will be described in detail by using the zone D2 marked as "C" in FIG. 8A as an example. FIGS. 9A, 9B and 9C are tables showing calculating process of direction expectation.

Figure 8B:
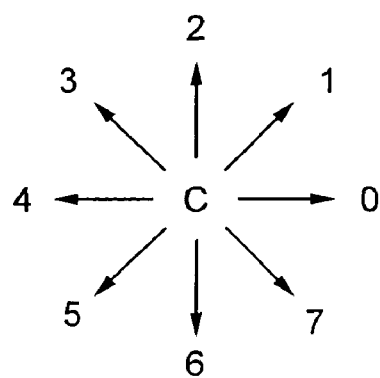
FIG. 8B shows an exemplary definition of search directions.

In step S121 in FIG. 4, the direction expectation calculator 25 performs searching each of radial directions around the propagation candidate zone D2, and determines the nearest reference zone in each direction. FIG. 8B shows search directions. A direction parallel to the row direction of the fingerprint image, which is the right direction (direction from row A to row F) in FIG. 8B, is set as direction 0, and a direction rotated by π/4 radian from the direction 0 in a counterclockwise direction is set as direction 1. Similarly, directions rotated by π/4 radian respectively are set as directions 2 to 7. Note that searching directions are not limited to the eight directions shown in FIG. 8B.

As a result of searching, a zone E2 is selected as a reference zone for the search direction 0, a zone E1 is for the search direction 1, a zone D1 is for the search direction 2, a zone C1 is for the search direction 3, a zone B2 is for the search direction 4, a zone A5 is for the search direction 5, a zone D9 is for the search direction 6, and a zone F4 is for the search direction 7.

Next, in step S122 in FIG. 4, the direction expectation calculator 25 obtains the direction of each reference zone and calculates the distance from the propagation candidate zone D2. The distance means a larger one of difference in row numbers and difference in column numbers between the propagation candidate zone and the reference zone (if both are same, arbitrary one). For example, for the reference zone A5 for the search direction 5, a difference in row numbers from the propagation candidate zone D2 is 3 and a difference in column numbers is 3, so the distance is 3. For the reference zone D9 for the search direction 6, a difference in row numbers from the propagation candidate zone D2 is 7 and a difference in column numbers is 0, so the distance is 7.

Figure 10:
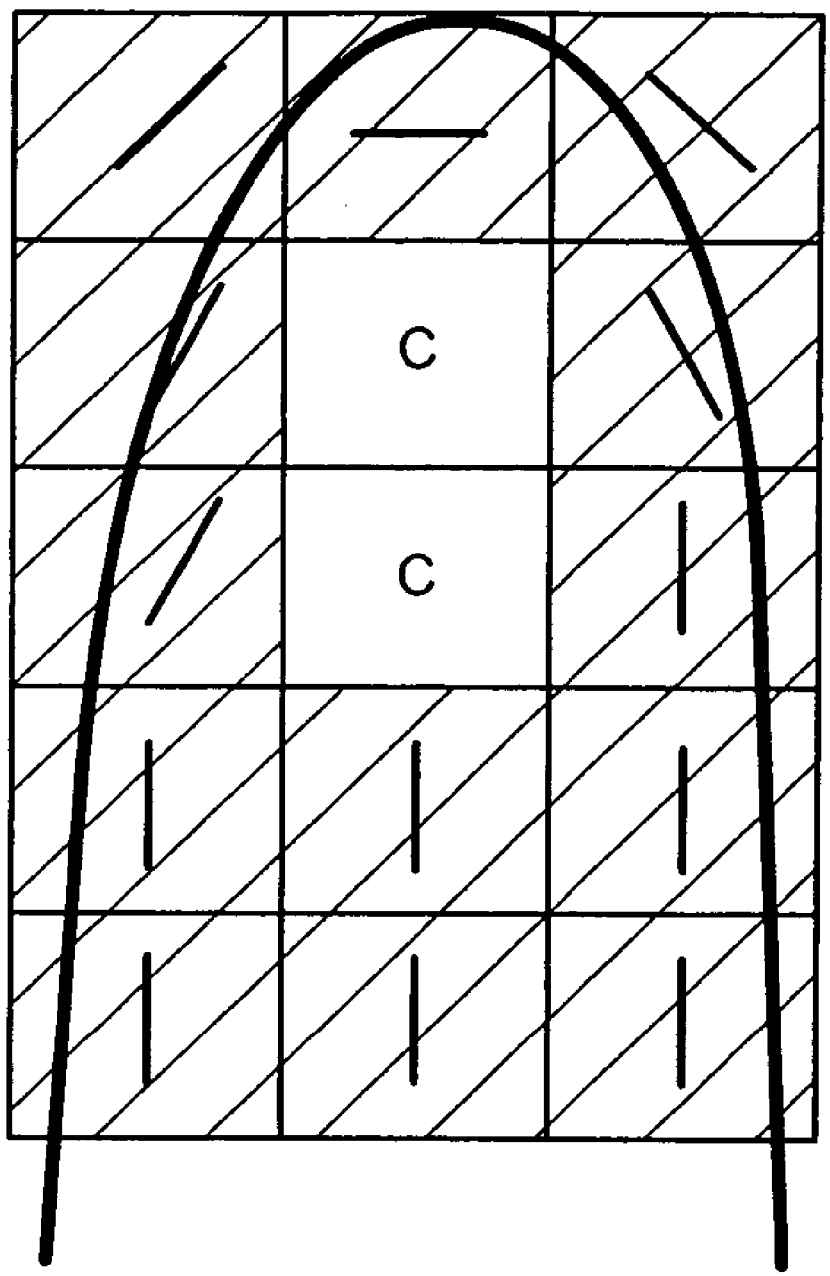
FIG. 10 is a diagram showing a loop-shaped ridge.

Next, in step S123 in FIG. 4, the direction expectation calculator 25 calculates inner angle weighting for each reference zone. Inner angle weighting means weighting calculated from an inner angle between a search direction and a direction of a reference zone, which is defined as shown in the table of FIG. 9B in the present embodiment. In other words, if the direction of a reference zone is orthogonal to the search direction, the maximum weighting 8 is applied, and as an inner angle becomes smaller, smaller weighting is applied. The reason will be described with reference to FIG. 10. FIG. 10 shows directions of reference zones with reference to a looped ridge shape often appeared near the core, and propagation candidate zones. The appearance frequency of the direction near the loop top is smaller than the direction orthogonal thereto. In the example shown in FIG. 10, the direction 0 (horizontal) of the loop top is appeared in only one zone, but the direction 4 (vertical), which is orthogonal to that near the top, is appeared in plural parts. Accordingly, if direction expectation is calculated simply, contribution of the direction near the top becomes smaller relatively, so the risk that the loop may break becomes higher. This is avoidable by defining inner angle weighting as shown in FIG. 9B. For example, since the difference (inner angle) between the search direction 1 ($\pi/4$) and the direction of reference zone E1 ($7\pi/8$) is $3\pi/8$, inner angle weighting of the reference zone E1 is 5.

Next, in step S124 in FIG. 4, the direction expectation calculator 25 calculates direction weighting contribution of each reference zone. Direction weighting contribution is a numerical value calculated by dividing inner angle weighting by a distance, in which a contribution that the direction of each reference zone makes to the direction expectation of a propagation zone is digitized. Effect of each reference zone becomes weaker as the distance becomes longer, so effect of distance is reflected by using a reciprocal number of the distance. For example, for the reference zone B2, the inner angle weighting is 3 and the distance is 2, so the direction weighting contribution is 1.5. Note that in FIG. 9A, the calculation result is shown up to the first decimal point.

Next, in step S125 in FIG. 4, the direction expectation calculator 25 sums direction weighting contributions for each direction in the reference zones to thereby calculate weighting contribution for each ridge direction. The calculation result is shown in the second row of FIG. 9C. For example, since only the reference zone D1 has the direction 0 in the reference zones in FIG. 9A, the total direction weighting contribution for the direction 0 is 8.0. Further, the reference zones C1 and B2 have the direction 1, so the total direction weighting contribution for the direction 1 is 6.5 (5.0+1.5).

Next, in step S126 in FIG. 4, the direction expectation calculator 25 determines whether any additional direction weighting contribution zone exits in the reference zones of the propagation candidate zone D2. Additional direction weighting contribution zone means a pair of reference zones, adjacent to the propagation candidate zones, in which search directions are different by $\pi$ radian and a difference in the directions is not more than $\pi/4$ radian. For the propagation candidate zone D2, no pair of reference zones satisfying the conditions is present, so the processing proceeds to step S128 in FIG. 4.

If an additional direction weighting contribution zone is determined as being present in step S126 in FIG. 4, the direction expectation calculator 25 calculates the additional direction weighting contribution and adds it to the total value of the direction weighting contribution in step S127. This is carried out for the following reason. That is, when an additional direction weighting contribution zone is present, a propagation candidate zone often takes the intermediate direction between the two directions, so this is performed to increase the expectation of the intermediate direction.

A specific example will be described by using a propagation candidate zone C2 in FIG. 8. The zone C2 is adjacent to two reference zones of zone D1 (direction 0) and zone B3 (direction 2), and the directional difference between them is $\pi/4$, so expectation of the direction 1 which is an intermediate direction between the two directions is increased. The additional direction weighting contribution of the intermediate direction should be the average of the direction weighting contributions of the zone D1 and the zone B3.

FIGS. 11A and 11B are tables showing a process of calculating the direction expectation of the propagation candidate zone C2. The process of calculating the direction weighting contribution shown in FIG. 11A is same as the case of propagation candidate zone D2. In FIG. 11A, three reference zones C1, B1 and B2 have the direction 1, so the total direction weighting contribution for the direction 1 is 13.0 (5.0+5.0+3.0). However, the propagation candidate zone C2 has an additional direction weighting contribution zone, so 3.0 ((4.0+2.0)/2) is added as additional direction weighting. Consequently, the total direction weighting contribution for the direction 1 is 16.0 (13.0+3.0), as shown in FIG. 11B.

Next, in step S128 in FIG. 4, the direction expectation calculator 25 smoothes the total value of the direction weighting contribution. In the present embodiment, it is smoothed by adding weighting of 2 to the self direction and adding weighting of 1 to the front and back direction. For example, in FIG. 9C, the total value of the direction weighting contributions is 6.5 for the direction 1, 8.0 for the direction 0, and 0.7 for the direction 2, so when the total value of the direction weighting contribution for the direction 1 is smoothed, it becomes 5.4 ((8.0+2*6.5+0.7)/4).

Next, in step S129 in FIG. 4, the direction expectation calculator 25 calculates the direction expectation of each direction based on the smoothed total value of the direction weighting contributions. Direction expectation means one in which direction weighting contributions of each direction are adjusted such that the total value becomes 0. The direction expectation is reflected on the zone direction confidence in processing described later, and is for adjusting such that an average value of the reflected result will not deviate largely from the original average value of the zone direction confidence.

In the present embodiment, direction expectation is calculated based on an increase/decrease ratio to a direction weighting contribution average value. For example, the smoothed direction weighting contribution 7.6 of the direction 0 indicates that it is 144% larger with reference to the direction weighting contribution average value (3.125).

Next, in step S109 in FIG. 3, the propagation zone direction extractor 26 in FIG. 2 determines the direction after performing adjustment to the direction confidence of each direction of the propagation candidate zones by using the direction expectation outputted from the direction expectation calculator 25. The direction confidence of each direction of the propagation candidate zones is previously extracted by the zone direction extractor 23 and stored on the data storage unit 22.

FIG. 12 shows direction confidence, direction expectation, and direction confidence after adjustment of each direction with reference to the propagation candidate zone D2. Direction confidence of each direction is direction confidence extracted by the zone direction extractor 23. In the direction confidence, no intense peak is shown, that is, the highest confidence is not significantly high enough relative to direction confidence of other directions. Therefore, even though the direction 6 having the highest confidence is determined temporarily, the direction confidence was low.

Adjusted direction confidence means one in which direction expectation is calculated as an increase ratio with respect to the direction confidence. For example, for the direction 0, direction confidence before adjustment is 40 and direction expectation is 144%, so the adjusted direction confidence is calculated to be 97.6 (40*(1+1.44).

In the adjusted direction confidence, two adjacent directions, that is, the direction 0 and the direction 7, show intense peaks, so the direction 0, which is the larger one, is determined as the direction of the propagation candidate zone D2.

The determined direction confidence of the direction 0 may be determined as the direction confidence of the propagation candidate zone D2. Alternatively, the degree of peak level may be digitized and reflected on the direction confidence.

In this way, direction and confidence of the propagation candidate zone D2 are determined. As a result, the direction of the propagation candidate zone D2 is determined as 0, which extracts the ridge direction correctly (see FIG. 6). Further, even if the direction confidence of 97.6 of the direction 0 is directly used as new zone direction confidence, it is higher than the initial direction confidence 60 of the direction 6, so it may be a high confidence zone with high probability.

In step S109, if distribution of direction expectation is large, the zone direction extractor 23 may recalculate the direction and the direction confidence from the fingerprint image with a reference size smaller than that set in step S102, and by using the recalculated direction confidence, adjust the direction confidence.

As criteria to determine whether distribution of direction expectation is large or small, if the largest difference in directions, of which direction expectation is positive value, is larger than $\pi/4$, distribution is determined as large, for example. Large angular difference means no peak is present in the direction.

By extracting the zone direction again with a smaller reference size, it is possible to extract an appropriate direction even with respect to a ridge near the core having high curvature.

Figure 13:
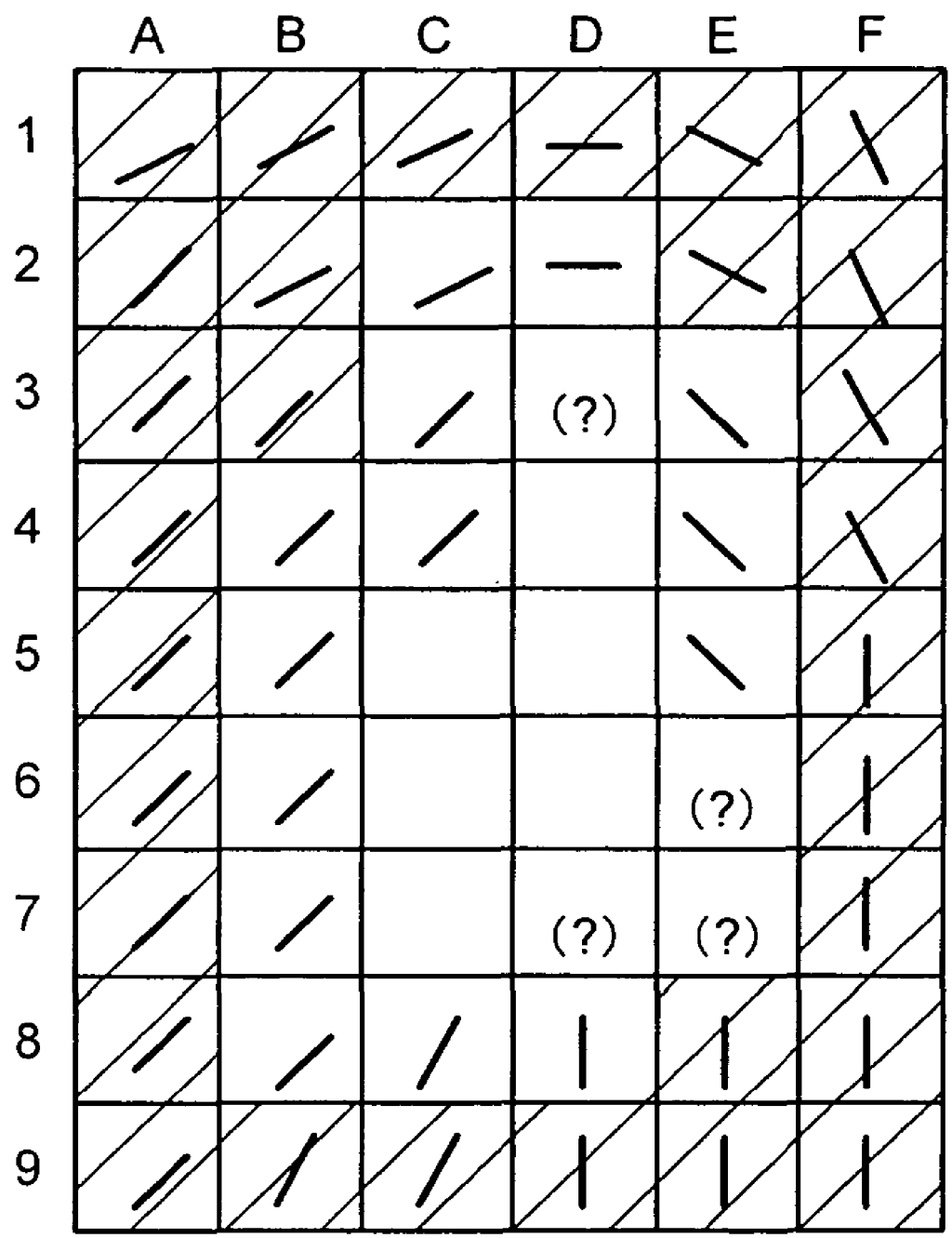
FIG. 13 is a map showing directional patterns of the first propagation.

Steps S108 and S109 in FIG. 3 are repeated for all propagation candidate zones determined in step S107. The result of such processing is shown in FIG. 13. In FIG. 13, propagation candidate zones marked with (?) such as a zone D3 indicate that directions thereof could not be determined since the direction confidence is low.

Next, in step S110 in FIG. 3, the data controller 21 in FIG. 2 counts the number of propagation candidate zones that the directions thereof are newly determined by the propagation zone direction extractor 26.

Then, in step S111 in FIG. 3, the data controller 21 determines whether there is any propagation candidate zone that the direction thereof is newly determined, and if not, the direction extraction processing ends. If there is a propagation candidate zone that the direction thereof is newly determined, the processing proceeds to step S112.

Next, in step S112 in FIG. 3, the high confidence zone area determiner 24 sets a new reference zone area by adding zones that the directions thereof are newly set through the previous steps, and returns to step S107 so as to continue the propagation processing.

Figure 14:
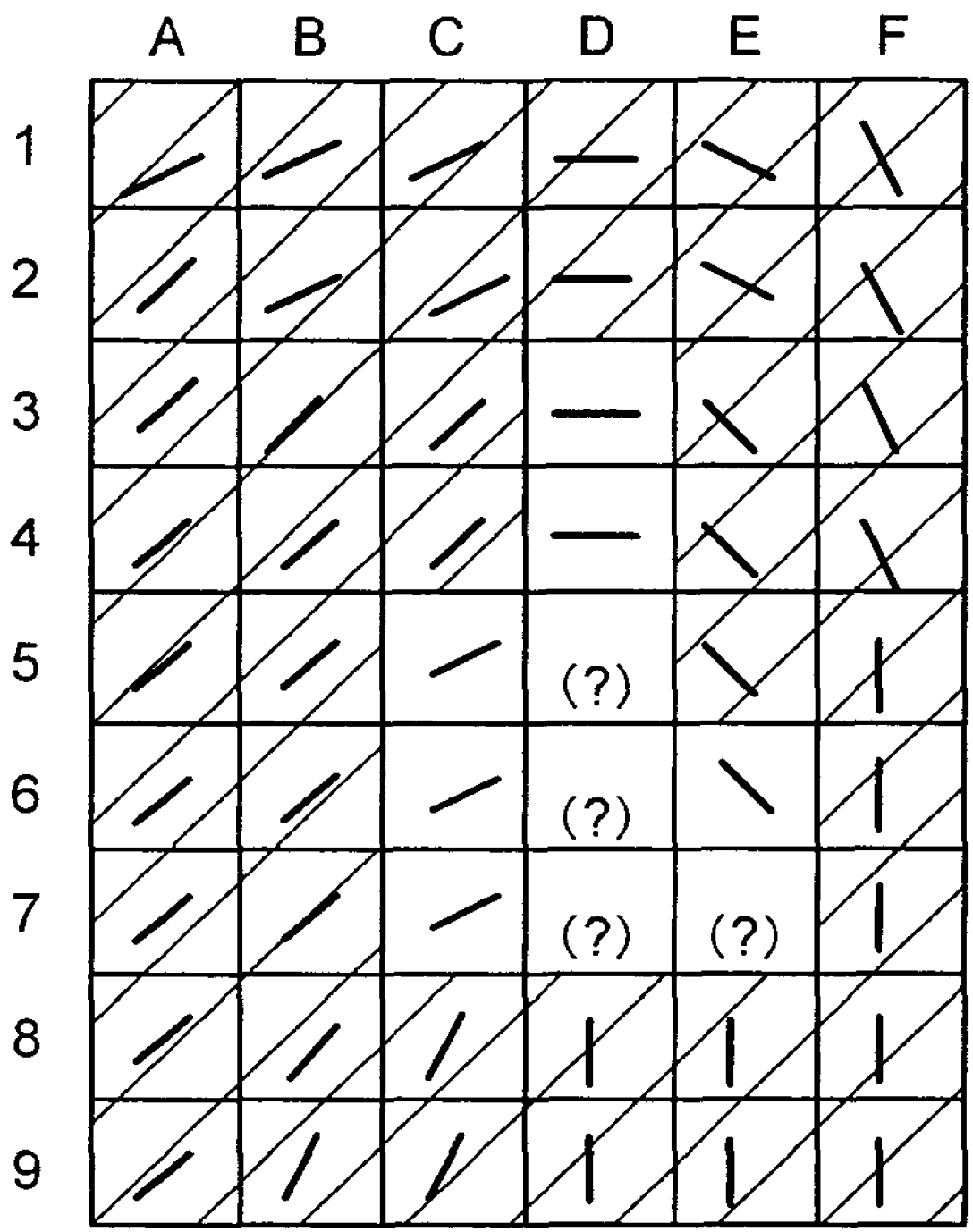
FIG. 14 is a map showing directional patterns of the second propagation.

In FIG. 14, the hatched zones constitute a reference zone area in which zones determined in the first propagation processing are added. The zones not hatched in FIG. 14 show the result of performing steps S108 and S109 to these propagation candidate zones.

Figure 15:
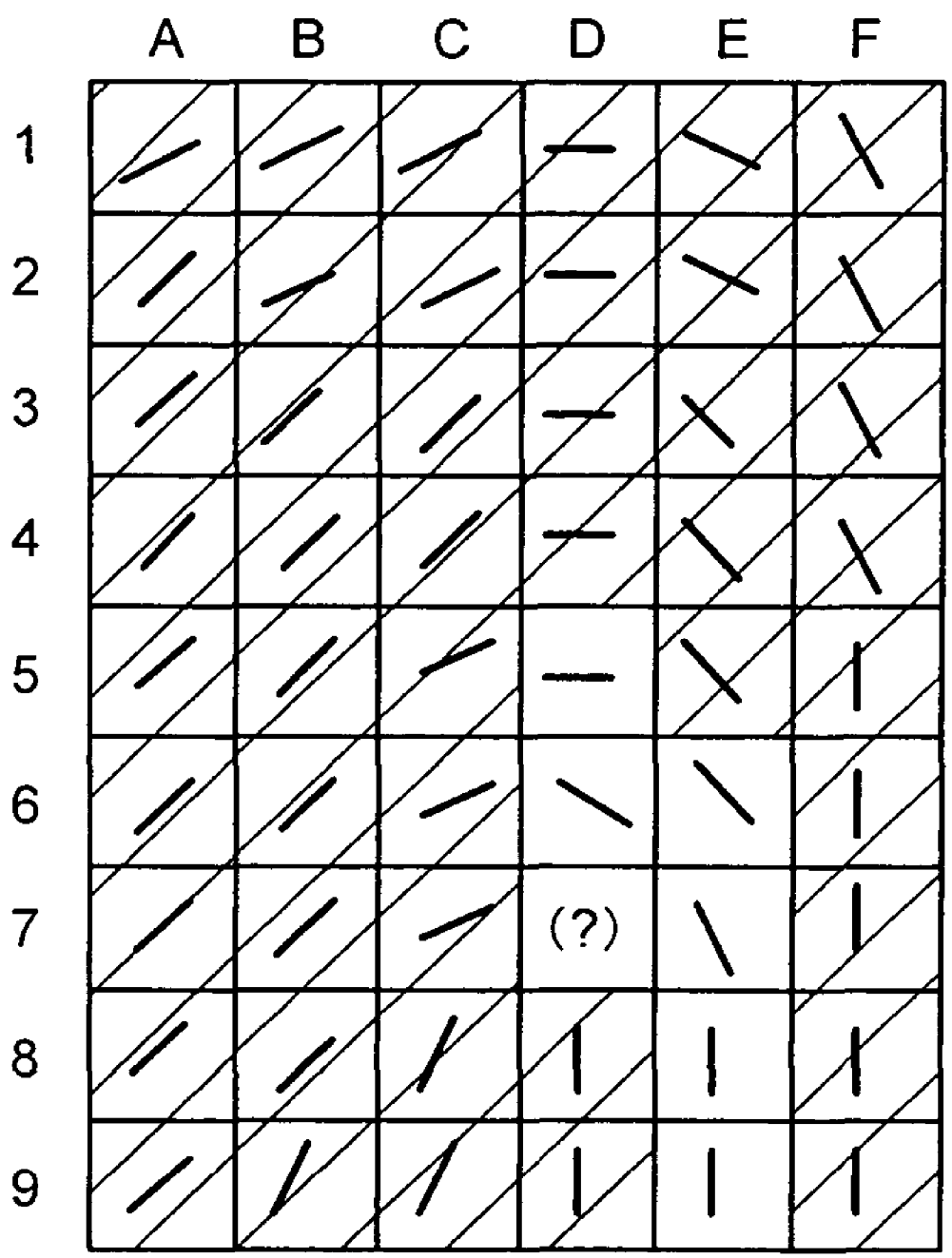
FIG. 15 is a map showing directional patterns of the third propagation.

Similarly, FIG. 15 shows the result of third propagation processing. In FIG. 15, a zone D7 marked with (?) shows that the direction could not be determined since directions of the adjacent reference zones are significantly different.

If a direction cannot be determined with a general direction confidence threshold, it is possible to determine the direction of a propagation candidate zone by decreasing the direction confidence threshold.

The present invention can also be carried out as a computer program which causes a computer to execute each processing described above and causes the computer to operate as a direction extraction unit.

In the direction extraction unit 12, when the propagation zone direction extractor 26 determines the direction in a propagation candidate zone, the direction expectation calculator 25 recalculates the direction confidence outputted from the zone direction extractor 25 based on the direction expectation calculated based on the direction of the reference zone, and by using the recalculated direction confidence, the direction in the propagation candidate zone is determined.

Therefore, it is possible to extract more accurate direction having high continuity with the direction in adjacent high confidence area and smaller deviation from the actual ridge direction.

In the direction extraction unit 12, when the direction expectation calculator 25 calculates direction confidence of a propagation candidate zone, not only directions in adjacent zones but also directions in a plurality of reference zones searched each of radial directions are used.

Therefore, it is possible to extract a direction having continuity not only with the direction in adjacent high confidence area but also with ridge directions of non-adjacent zones in the high confidence area.

In the direction extraction unit 12, when the direction expectation calculator 25 calculates direction confidence, large weighting is applied to a direction in a reference zone orthogonal to a search direction.

Therefore, it is possible to extract a direction accurately even for an area near the core or delta where a loop-shaped ridge is present.

In the direction extraction unit 12, when the propagation zone direction extractor 26 determines the direction in a propagation candidate zone, if the direction confidence after recalculation based on the direction expectation is low, the direction is not determined but suspended.

Therefore, more accurate direction can be extracted in the next propagation processing, so it is possible to extract a more accurate direction having smaller deviation from the actual ridge direction.

In the direction extraction unit 12, if directional distribution of direction expectation is large, the propagation zone direction extractor 26 recalculates the direction confidence of the propagation zone based on the direction confidence recalculated with a smaller reference size for extracting the direction.

Therefore, it is possible to extract an appropriate direction of a ridge having high curvature in a direction unstable area. In other words, an accurate direction can be extracted for an area near the core or delta in which ridge curvature is high.

In the direction extraction unit 12, if propagation candidate zones include an additional direction weighting contribution zone, the direction expectation calculator 25 adds direction expectation with respect to an intermediate direction between two reference zones constituting the additional direction weighting contribution zone.

Therefore, it is possible to extract an accurate direction for a zone near the core or delta having high curvature.

What is claimed is:

1. A ridge direction extraction device comprising:
   a zone direction extractor which divides an input fingerprint image into a plurality of zones, and calculates a ridge direction and confidence of the ridge direction for each of the plurality of zones;
   a high confidence zone area determiner which determines a high confidence zone area based on the confidence of the ridge direction for each of the plurality of zones calculated by the zone direction extractor, and determines a plurality of propagation candidate zones around the high confidence zone area;

a direction expectation calculator which determines a first plurality of reference zones for a first propagation candidate zone from among the plurality of propagation candidate zones by searching a plurality of search directions around the first propagation candidate zone, calculates inner angle weighting and direction weighting contributions of each of the first plurality of reference zones, calculates weighting contribution for each ridge direction by summing the direction weighting contribution for each ridge direction of the first plurality of reference zones, and calculates direction expectation for each ridge direction based on a ratio between the weighting contribution for each ridge direction and an average thereof; and a propagation zone direction extractor which recalculates direction confidence of ridge direction for the first propagation candidate zone based on the direction expectation calculated by the direction expectation calculator, and determines a direction of the first propagation candidate zone based on the recalculated direction confidence.

2. The ridge direction extraction device of claim 1, wherein the direction expectation calculator uses directions in a plurality of reference zones searched in a radial direction of the first propagation candidate zone in addition to directions in a plurality of reference zones adjacent to the first propagation candidate zone to calculate the direction expectation of the first propagation candidate zone.

3. The ridge direction extraction device of claim 1, wherein the direction expectation calculator applies a maximum inner angle weighting to a reference zone whose ridge direction is orthogonal to a corresponding search direction, from among the plurality of search directions, of the reference zone.

4. The ridge direction extraction device of claim 1, wherein the propagation zone direction extractor, when determining the direction in the first propagation candidate zone, does not determine but suspends the direction if the direction confidence after the recalculation based on the direction expectation is lower than a threshold.

5. The ridge direction extraction device of claim 1, wherein if directional distribution of the direction expectation of the first propagation candidate zone is greater than a threshold, the propagation zone direction extractor recalculates direction confidence of the first propagation candidate zone based on the input fingerprint image divided into a plurality of zones of smaller size.

6. The ridge direction extraction device of claim 1, wherein if an additional direction weighting contribution zone exists for the first propagation candidate zone, the propagation zone direction extractor adds to the direction expectation a direction weighting contribution with respect to an intermediate direction between two reference zones constituting the additional direction weighting contribution zone.

7. A ridge direction extraction method for analyzing a fingerprint image divided into a plurality of zones and extracting a ridge direction of each of the plurality of zones, the method comprising:

dividing an input fingerprint image into a plurality of zones, and calculating a ridge direction and confidence of the ridge direction for each of the plurality of zones;

determining a high confidence zone area based on the confidence of the ridge direction for each of the plurality of zones;

determining a plurality of propagation candidate zones around the high confidence zone area;

determining a first plurality of reference zones for a first propagation candidate zone from among the plurality of propagation candidate zones by searching a plurality of search directions around the first propagation candidate zone;

calculating inner angle weighting and direction weighting contributions of each of the first plurality of reference zones;

calculating weighting contribution for each ridge direction by summing the direction weighting contribution for each ridge direction of the first plurality of reference zones;

calculating direction expectation for each ridge direction based on a ratio between the weighting contribution for each ridge direction and an average thereof;

recalculating direction confidence of a ridge direction for the first propagation candidate zone based on the calculated direction expectation; and determining a direction of the first propagation candidate zone based on the recalculated direction confidence.

8. The method of claim 7, wherein directions in a plurality of reference zones in a radial direction of the first propagation candidate zone are searched in addition to directions in a plurality of reference zones adjacent to the first propagation candidate zone to calculate the direction expectation of the first propagation candidate zone.

9. The method of claim 7, wherein a maximum inner angle weighting is applied to a reference zone whose ridge direction is orthogonal to a corresponding search direction, from among the plurality of search directions, of the reference zone.

10. The method of claim 7, wherein when determining the direction in the first propagation candidate zone, the direction is not determines but suspended if the direction confidence after the recalculation based on the direction expectation is lower than a threshold.

11. The method of claim 7, wherein if directional distribution of the direction expectation of the first propagation candidate zone is greater than a threshold, direction confidence of the first propagation candidate zone is recalculated based on the input fingerprint image divided into a plurality of zones of smaller size.

12. The method of claim 7, wherein if an additional direction weighting contribution zone exists for the first propagation candidate zone, a direction weighting contribution with respect to an intermediate direction between two reference zones constituting the additional direction weighting contribution zone is added to the direction expectation of the first propagation candidate zone.

13. A non-transitory computer-readable storage medium storing ridge direction extraction program for analyzing a fingerprint image divided into a plurality of zones and extracting a ridge direction of each zone, the ridge direction extraction program configured to enable a computer to execute a method comprising:

dividing an input fingerprint image into a plurality of zones, and calculating a ridge direction and confidence of the ridge direction for each of the plurality of zones;

determining a high confidence zone area based on the confidence of the ridge direction for each of the plurality of zones;

determining a plurality of propagation candidate zones around the high confidence zone area;

determining a first plurality of reference zones for a first propagation candidate zone from among the plurality of propagation candidate zones by searching a plurality of search directions around the first propagation candidate zone;

calculating inner angle weighting and direction weighting contributions of each of the first plurality of reference zones;

calculating weighting contribution for each ridge direction by summing the direction weighting contribution for each ridge direction of the first plurality of reference zones;

calculating direction expectation for each ridge direction based on a ratio between the weighting contribution for each ridge direction and an average thereof;

recalculating direction confidence of a ridge direction for the first propagation candidate zone based on the calculated direction expectation; and determining a direction of the first propagation candidate zone based on the recalculated direction confidence.

* * * * *

UNITED STATES PATENT AND TRADEMARK OFFICE
CERTIFICATE OF CORRECTION

| | |
|---|---|
| PATENT NO. | : 7,856,127 B2 |
| APPLICATION NO. | : 11/501874 |
| DATED | : December 21, 2010 |
| INVENTOR(S) | : Hara |

It is certified that error appears in the above-identified patent and that said Letters Patent is hereby corrected as shown below:

In the Drawings

Delete drawing sheets 16 and 17, and replace with drawing sheets 16 and 17. (attached)

Signed and Sealed this
Fourth Day of June, 2013

Teresa Stanek Rea
*Acting Director of the United States Patent and Trademark Office*

Figure 16B:
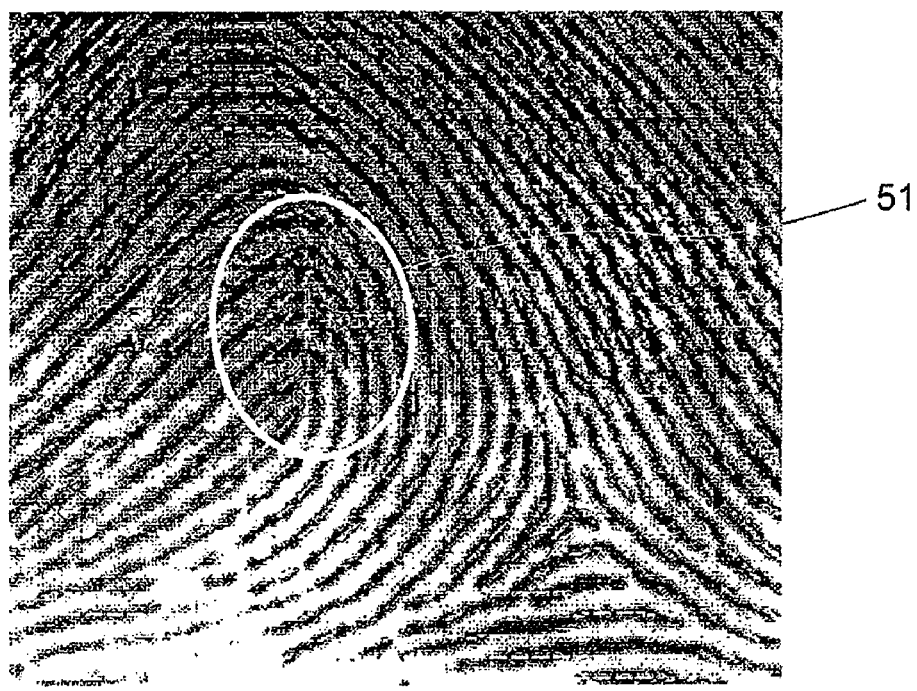
FIG. 16B shows ridge directions extracted by means of conventional art.

RELATED ART FIG. 16A
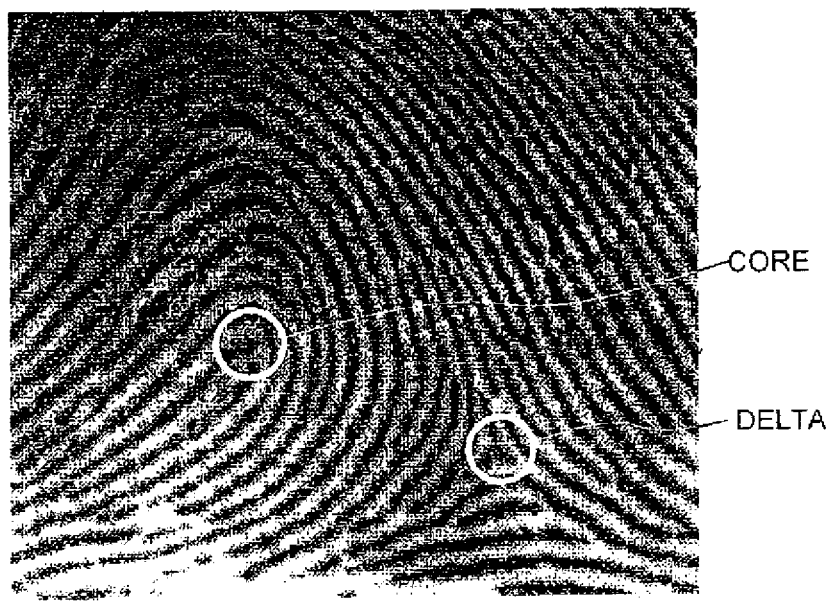
FIG. 16B
RELATED ART
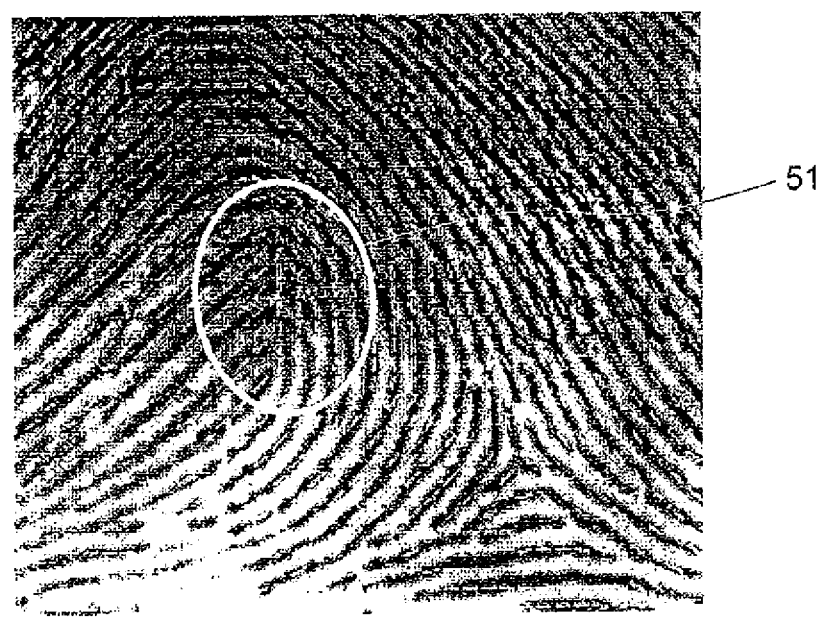

RELATED ART

FIG. 17A

RELATED ART

FIG. 17B